United States Patent
Zhao et al.

(10) Patent No.: US 12,202,932 B2
(45) Date of Patent: Jan. 21, 2025

(54) FORMULATION AND PROCESSING OF DEGRADABLE HIGH Tg EPOXY COMPOSITE THAT CAN BE DEGRADABLE AT EXTREMELY LOW TEMPERATURE

(71) Applicants: CNPC USA CORP., Houston, TX (US); Beijing Huamei, Inc., Beijing (CN); China National Petroleum Corporation, Beijing (CN)

(72) Inventors: Lei Zhao, Houston, TX (US); Jiaxiang Ren, Houston, TX (US); Cheng Peng, Houston, TX (US); Yu Liu, Beijing (CN)

(73) Assignees: CNPC USA CORPORATION, Houston, TX (US); BEIJING HUAMEI, INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 0 days.

(21) Appl. No.: 17/658,391

(22) Filed: Apr. 7, 2022

(65) Prior Publication Data

US 2023/0323015 A1    Oct. 12, 2023

(51) Int. Cl.
- C08G 59/24 (2006.01)
- C08G 59/68 (2006.01)
- C08J 3/24 (2006.01)
- C08K 5/07 (2006.01)

(52) U.S. Cl.
CPC ........... *C08G 59/24* (2013.01); *C08G 59/682* (2013.01); *C08J 3/24* (2013.01); *C08K 5/07* (2013.01); *C08J 2363/00* (2013.01)

(58) Field of Classification Search
None
See application file for complete search history.

(56) References Cited

U.S. PATENT DOCUMENTS

| | | |
|---|---|---|
| 2002/0013420 A1 | 1/2002 | Wang et al. |
| 2014/0235792 A1 | 8/2014 | Reynolds et al. |
| 2015/0210846 A1* | 7/2015 | Qi ............................ H01B 3/40 523/427 |
| 2016/0075872 A1 | 3/2016 | Palmese et al. |
| 2016/0115368 A1 | 4/2016 | Sadana et al. |
| 2016/0237273 A1* | 8/2016 | Oka ................... C08G 59/4215 |
| 2017/0158807 A1* | 6/2017 | Yoshimoto ............... C08K 9/08 |
| 2017/0313831 A1* | 11/2017 | Kakutani .................. B32B 7/04 |
| 2018/0311912 A1* | 11/2018 | Restuccia ............... B32B 5/022 |
| 2019/0055369 A1* | 2/2019 | Taniguchi ............ C08G 59/686 |
| 2019/0194382 A1* | 6/2019 | Jelic ..................... C08G 59/5073 |
| 2019/0270844 A1* | 9/2019 | Peters ..................... C08G 59/26 |
| 2020/0109233 A1* | 4/2020 | Kano ........................ C08J 5/042 |
| 2022/0002472 A1* | 1/2022 | Abu-Omar .......... C08G 59/3227 |

(Continued)

OTHER PUBLICATIONS

International Search Report, PCT/US22/78595, Mailed Apr. 10, 2023.

*Primary Examiner* — Megan Mcculley
(74) *Attorney, Agent, or Firm* — Frank Gao, Esq.

(57) ABSTRACT

The patent application discloses a degradable thermoset composite. The composite comprises a reaction product of an epoxy resin, a cross-linker, a catalyst. The epoxy resin mixture may comprise at least one cycloaliphatic epoxide. The reaction product may have a glass transition temperature greater than or equal to 140° C. as measured by DMA.

5 Claims, 8 Drawing Sheets

(56) References Cited

U.S. PATENT DOCUMENTS

| | | | |
|---|---|---|---|
| 2022/0041825 A1* | 2/2022 | Lenzi | C08G 73/1067 |
| 2022/0251370 A1* | 8/2022 | Niegemeier | C08L 63/00 |
| 2022/0306820 A1* | 9/2022 | Markou | C08K 7/16 |
| 2022/0325073 A1* | 10/2022 | Markou | C08G 59/688 |
| 2023/0022703 A1* | 1/2023 | Zhao | C08G 59/4215 |

* cited by examiner

FORMULATION AND PROCESSING OF DEGRADABLE HIGH Tg EPOXY COMPOSITE THAT CAN BE DEGRADABLE AT EXTREMELY LOW TEMPERATURE The invention disclosure relates to thermoset resins, in particular, a formulation and processing of degradable High Tg epoxy composite, more specifically, the epoxy composite that can be degradable at low temperature.

BACKGROUND

A wide variety of downhole tools may be used within a well bore in connection with producing hydrocarbons or reworking a well that extends into a hydrocarbon formation. Downhole tools such as frac plugs, bridge plugs, and packers, for example, may be used to seal a component against casing along the well bore wall or to isolate one pressure zone of the formation from another.

After the production or reworking operation is complete, these downhole tools must be removed from the well bore. Tool removal has conventionally been accomplished by complex retrieval operations, or by milling or drilling the tool out of the well bore mechanically. Thus, downhole tools are either retrievable or disposable. Disposable downhole tools have traditionally been formed of drillable metal materials such as cast iron, brass and aluminum.

Therefore, a need exists for degradable downhole tools that are reliably degradable without being milled or drilled out, and for methods of its use.

SUMMARY

In one aspect, one embodiment discloses a degradable thermoset composite. The composite comprises a reaction product of an epoxy resin, a cross-linker, and a catalyst. The reaction product may have a glass transition temperature greater than or equal to 140° C. as measured by DMA.

Optionally in any aspect, the reaction product of the degradable thermoset composite may have a tensile strength of at least 10000 psi.

Optionally in any aspect, the catalyst may comprise at least one of solid base or solid acid.

Optionally in any aspect, the cycloaliphatic epoxide comprises (3,4-epoxycyclohexyl-methyl)-3,4-epoxy-cyclohexane carboxylate, bis-(3,4-epoxycyclohexyl) adipate or mixtures thereof.

Optionally in any aspect, the cross-linker comprises a cycloaliphatic anhydride.

Optionally in any aspect, the cycloaliphatic anhydride comprises norbornene-based dicarboxylic anhydride.

Optionally in one aspect, the degradable thermoset composition may degrade from about 80° C. to about 150 c under water or brine.

Optionally in any aspect, the norbornene-based dicarboxylic anhydride comprises nadic anhydride, methyl nadic anhydride or a mixture thereof.

Optionally in any aspect, the degradable thermoset composite may further comprise fibers, such as glass fibers, carbon fibers, aramid fibers, loadings of fibers are from about 20% to about 60% in volume.

Further in another aspect, one embodiment discloses a process for forming a degradable thermoset composition. The method may comprise steps of admixing an epoxy and a cross-linker to form a mixture at room temperature; adding a catalyst to the mixture; and mixing with fibers to form raw materials, wherein the epoxy comprises at least one at least one cycloaliphatic epoxide.

Optionally in any aspects, the process may further comprise molding raw materials into near-net shape parts with hot press.

Optionally in any aspects, the process further comprises a step of post treating the near-net shape parts.

Optionally in any aspects, the epoxy resin may further comprise a cycloaliphatic epoxide.

Optionally in any aspects, the molding process is conducted within 24 hours without a pre-cure process.

In yet another aspect, one embodiment discloses a degradable thermoset composite comprises a reaction product of at least one norbornene-based dicarboxylic anhydride; at least one cycloaliphatic epoxide; and a catalyst, wherein the degradable thermoset composite degrades from about 80° C. to about 100° C. under water or brine.

Optionally in any aspect, the norbornene-based dicarboxylic anhydride is nadic anhydride, methyl nadic anhydride or a mixture thereof.

Optionally in any aspect, ratio between the cycloaliphatic epoxide and the norbornene-based dicarboxylic anhydride is about from 1:1 to about 1:1.5.

Optionally in any aspect, ratio between the cycloaliphatic epoxide and the catalyst, such as $Ca(OH)_2$, is about 1:0.8 to about 1:1.2.

BRIEF DESCRIPTION OF THE DRAWINGS

In order to illustrate the technical solutions more clearly in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

Figure 1:
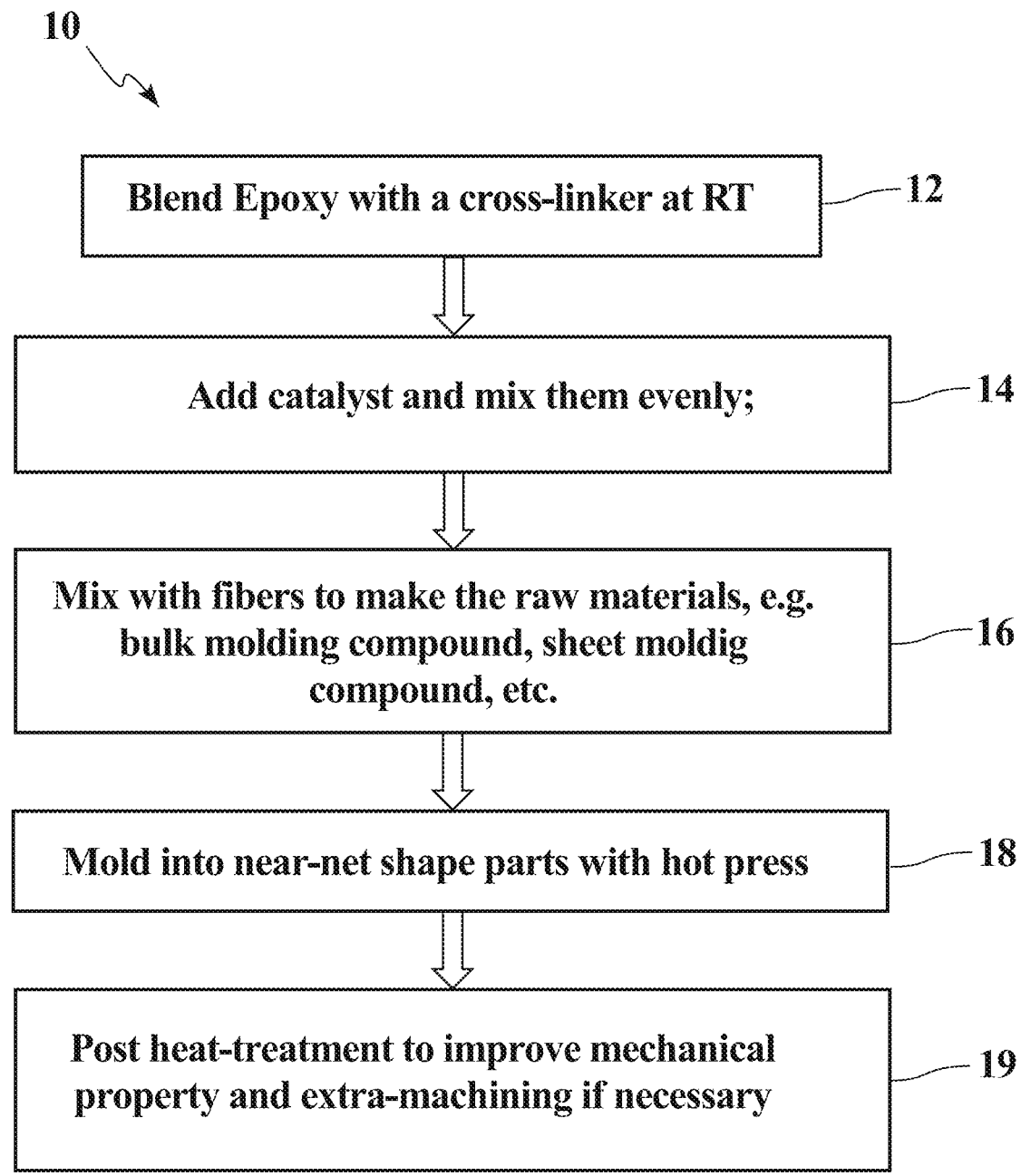
FIG. 1 is a process for forming a degradable thermoset composition according to an embodiment of the present disclosure.

The implementation, functional features and advantages of the present disclosure will be further described with reference to the accompanying drawings.

DETAILED EMBODIMENTS

Definitions

The term "about" means plus or minus 20%, more preferably plus or minus 10%, even more preferably plus or minus 5%, most preferably plus or minus 2%.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All percentages for weights expressed herein are by weight of the total product unless specifically stated otherwise.

The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

The Inventions

Epoxy resins are one of the most widely used engineering resins, and are well-known for their use in composites with high strength fibers. Epoxy resins form a glassy network, exhibit excellent resistance to corrosion and solvents, good adhesion, reasonably high glass transition temperatures, and adequate electrical properties.

The impact strength, fracture toughness, ductility, as well as most other physical properties of crosslinked epoxy resins may be controlled by the chemical structure and ratio of the epoxy resin and cross-linker, by any added macroscopic fillers, toughening agents, and other additives. Typical performance requirements of thermoset resins, including epoxies, include a high softening point (>200° C.), low flammability, hydrolytic resistance, chemical and solvent resistance, and dielectric rigidity.

Performance criteria for the compositions during storage, cure, and for the thermoset resins formed from epoxies vary.

Despite the fact that degradable polymers or polymer composites are commercially available in fabrication of various downhole tools including degradable plug, they are mainly thermoplastics with temperature rating lower than 80° C. That cannot meet the needs in developing ultra-deep shale well with downhole temperature easily above 140° C. Thermoset polymers with high temperature rating are good candidates to meet this market. However, there is rarely any degradable thermoset polymer material reported able to survive that harsh condition except Cyanate Ester Composite developed by Baker Hughes. However, Cyanate Ester has extremely high cost and is also brittle in nature. To address this issue, cost-efficient epoxy material with high flexibility in material selections are appealing.

For plug application, not only does it require a high glass transition temperature (Tg) for high temperature wells, but also needs degradation at relatively low temperature, a contradicting requirements that cannot be met by any single epoxy materials. Because high Tg epoxy resin can hardly degrade at low temperature.

In one aspect, embodiments disclosed herein relate to thermoset resins formed from such compositions. The compositions, for example, may include an admixture of cycloaliphatic epoxy resins. Cross-linkers used in the curable compositions may include, for examples, cycloaliphatic anhydrides. In a family of embodiments, compositions disclosed herein may include an admixture of a) a cycloaliphatic epoxy resin; b) a catalyst; and c) one or more cycloaliphatic anhydride cross-linkers. The cycloaliphatic epoxide may further include (3,4-epoxycyclohexyl-methyl)-3,4-epoxy-cyclohexane carboxylate, bis-(3,4-epoxycyclohexyl) adipate or mixtures thereof.

Without pre-cure, such as a thermal cure, the thermoset resins may have a good balance of physical properties, including a high glass transition temperature, a high tensile strength, a high tensile modulus, and degrading at low temperature in the water or salt solution.

A degradable thermoset composite may comprise a reaction product of an admixture of epoxy resin, a cross-linker, and a catalyst. The epoxy resin mixture may comprise at least an epoxy resin. The epoxy resin may include at least one cycloaliphatic epoxide. The degradable thermoset composite may have a tensile strength of at least about 10,000 psi, in one embodiment.

For plug application, not only does it require high Tg for HT wells, but also needs degradation at relatively lower temperature, a contradicting requirements are hard to be met by a single epoxy material, because high Tg epoxy can hardly degrades at low temperature. Surprisingly, after extensive formulation process, a formulation and processing method that can achieve this challenging goal (i.e., Tg>140° C., and degrade at 95° C.). The present invention is expected to be a great business interest in various oil and gas application not just limited to degradable plugs.

The disclosed invention embodiment provides a formulation to make cost-efficient degradable epoxy composites that can perform over 140° C. as temporary blocking tool, while degrading at lower temperature from about 80° C. to about 150° C. for example, when the tools are no longer needed. That is the typical requirements to make downhole degradable plugs used in hydraulic fracturing ultra-deep and high temperature wells. So far, no polymer based degradable plug can achieve this in the market due to its low temperature rating (<95° C.).

Degradable epoxy disclosed herein may have a glass transition temperature (Tg) of at least 140° C. in some embodiments, as measured by differential scanning calorimetry (DSC) or dynamic mechanical analysis (DMA). In other embodiments, degradable epoxy disclosed herein may have a glass transition temperature of at least 175° C.; at least 200° C. in other embodiments; at least 210° C. in other embodiments; at least 220° C. in other embodiments; at least 22° C. in other embodiments; at least 225° C. in other embodiments; and at least 226° C. in yet other embodiments.

Measurement of glass transition temperature by DSC may be performed, for example, using a Q100 DSC from T.A. Instruments, set up for 10° C./min scans. Sample sizes is typically kept under 15 mg. Hermetic pans with holes punched in the lids may be used to contain the samples in the DSC cell. DSC scans are analyzed for final Tg using half extrapolated tangents (Tg analysis).

Dynamic mechanical analysis (DMA) was carried out using a TA Instruments Q800 DMA (New Castle, Germany) at standard frequency of 1 Hz, amplitude of 60 μm and a heating rate of 3° C./min. The testing configuration was a double cantilever configuration with nominal sample dimensions of 60×10×2.5 mm³, according to ASTM D5023 standard. Thermoset resins disclosed herein may have a tensile modulus of at least 145000 psi, as measured according to ASTM D638, in some embodiments. In other embodiments, thermoset resins disclosed herein may have a tensile modulus of at least 146000 psi; at least 150000 psi in other embodiments; at least 160000 psi in other embodiments; and at least 170000 psi in yet other embodiments.

Degradable epoxy disclosed herein may have a tensile strength of at least 10000 psi, as measured according to ASTM D638, in some embodiments. In other embodiments, thermoset resins disclosed herein may have a tensile strength of at least 12000 psi; at least 13000 psi in other embodiments; at least 14000 psi in other embodiments; and at least 15000 psi in yet other embodiments.

Degradable epoxy disclosed herein may have an elongation at break of at least 1 percent, as measured according to ASTM D638, in some embodiments. In other embodiments, thermoset resins disclosed herein may have an elongation at break of at least 1.5 percent; at least 2 percent in other embodiments; at least 2.5 percent in other embodiments; and at least about 3 percent in yet other embodiments.

The above described degradable epoxy may be formed by admixing an epoxy resin, a catalyst, and an aliphatic anhydride cross-linker (such as norbornene-based dicarboxylic anhydride), to form a composition without pre-cure the composition by exposing the composition to elevated temperatures, such as greater than or equal to about 150° C. in some embodiments, greater than or equal to about 175° C. in other embodiments, and greater than or equal to about 200° C. in yet other embodiments. The compositions disclosed herein, as mentioned above, may exhibit high reactivity.

More specifically, as shown in FIG. 1, a process 10 for forming a degradable thermoset composition may comprise steps of: blending an epoxy with a cross-linker (acid anhydride) in step 12; adding a catalyst, and mixing them evenly in step 14; mixing with fibers, such as glass fibers, carbon fibers, aramid fibers, for example, to make the raw materials, e.g., bulk molding compound, sheet molding compound, etc. in step 16; molding into near-net shape parts with hot press in step 18; and post heat-treatment to improve mechanical property and extra-machining if necessary in step 19.

In the second step, solid catalyst powders are added and the resulting mixture are mixed evenly, the amount of cross-linker and solid catalyst is dependent on the requirement for degradation rate. Stoichiometric ratio between epoxy and cross-linker is typically used from about 1:1 to about 1:1.5, up to 30% off may also be accepted or used to tune mechanical strength. More specifically, to make the formulation work, ratio between epoxy resin and cross-linker may be super critical. Ratio between cycloaliphatic epoxide and cycloaliphatic anhydride may have to be controlled between 1:1 and 1:1.5, for example.

Useful cycloaliphatic epoxides are compounds that include a saturated carbon ring having an epoxy oxygen bonded to two vicinal atoms in the carbon ring as illustrated by the following structure H:

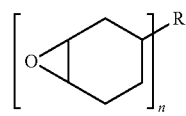

(I)

wherein R is a linking group and n is a number from 2 to 10, preferably from 2 to 4 and more preferably 2 to 3. Di- or polyepoxides are formed when n is 2 or more. The cycloaliphatic epoxy resin may have an epoxy equivalent weight of about 95 to 250, especially from about 100 to 150. Mixtures of mono-, di- and/or polyepoxides can be used. Cycloaliphatic epoxy resins as described in U.S. Pat. No. 3,686,359, may be used in the present invention.

Figure 2:
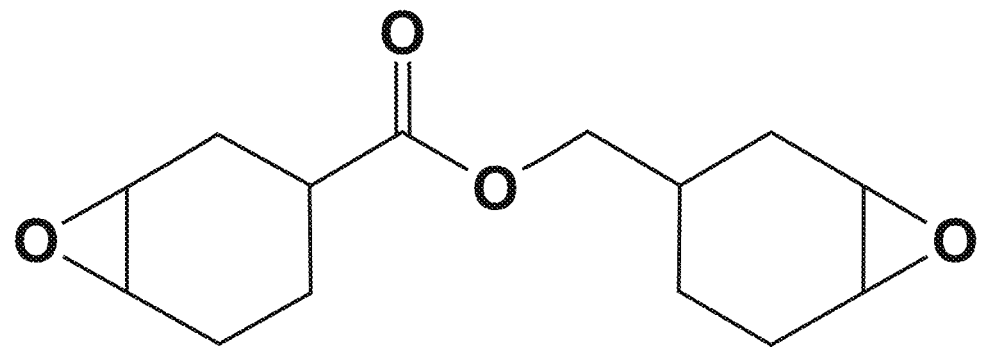
FIG. 2 is a chemical structure of 3,4-epoxycyclohexyl methyl-3,4-epoxycyclohexanecarboxylate.

The cycloaliphatic epoxy resins may include 3,4-epoxycyclohexylmethyl-3,4-epoxycyclohexanecarboxylate as shown in FIG. 2, bis-(3,4-epoxycyclohexyl) adipate or mixtures thereof.

The norbornene-based dicarboxylic anhydride includes compounds such as those represented by the following structure:

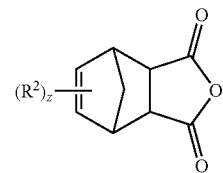

wherein each R is hydrocarbyl, halogen or inertly substituted hydrocarbyl. By "inertly substituted", it is meant that the substituent does not adversely affect the ability of the anhydride group to react with and cure the epoxy resin, z may be from zero to 8, and is preferably 0 to 2 and more preferably 0 or 1. $R^2$, if present, preferably is alkyl, more preferably methyl. In the case where z is 1 or more, at least one $R^2$ group preferably is attached to the 5-carbon. In norbornene-based dicarboxylic anhydrides, the dicarboxylic anhydride group can be in the exo or endo conformation. In this invention, both the exo and endo conformations are useful, as are mixtures thereof. The most preferred norbornene-based dicarboxylic anhydrides are bicyclo[2.2.1]-5-heptene-2,3-dicarboxylic anhydride (nadic anhydride, i.e., an anhydride of the foregoing structure in which z is zero), bicyclo[2.2.1]-methylhept-5-ene-2,3-dicarboxylic anhydride (methyl nadic anhydride, i.e., an anhydride of the forgoing structure in which $R^2$ is methyl and z is one. In the latter case, the methyl group preferably is bonded to the 5 carbon atom.

Figure 3:
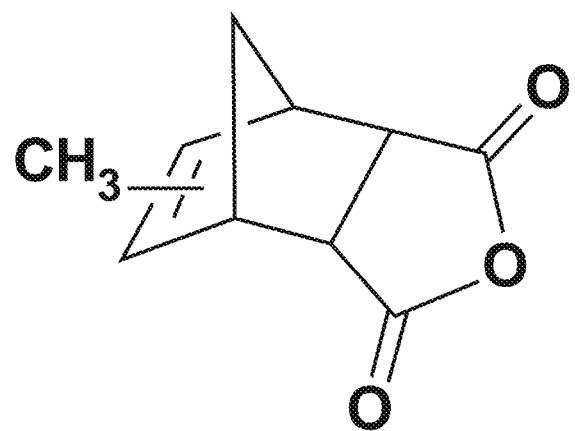
FIG. 3 shows a chemical structure of methyl nadic anhydride.

In one embodiment, the norbornene-based dicarboxylic anhydride comprises nadic anhydride, methyl nadic anhydride (shown in FIG. 3), or a mixture thereof. As shown in the following Table 1, ratio out of this range has various issues, either Tg is too low or cannot degrade at lower temperature.

TABLE 1

Influence of resin/crosslinker ratio on performance

| Resin/cross-linker ratio | 1:0.5 | 1:0.7 | 1:1 | 1:1.4 | 1:1.8 |
|---|---|---|---|---|---|
| Result | Fail | Fail | work | work | Fail |
| Reason | Tg <110° C., Degrade at 95° C. | Tg <130° C., Degrade at 95° C. | Tg >140° C. Degrade at 95° C. | Tg >150° C. Degrade at 95° C. | Can not degrade at 95° C. |

Besides epoxy resin and cross-linker ratio, load of catalyst may also be critical. Take Ca(OH)$_2$ as an example, ratio between epoxy resin and Ca(OH)$_2$ should be controlled between about 1:0.8 to about 1:1.2. As shown in the following Table 2, ratio out of this range has various issues, either failing to degrade or causing problems in processing.

TABLE 2

Influence of resin/catalyst ratio on performance

| Resin/CaOH$_2$ | 1:0.2 | 1:0.4 | 1:0.8 | 1:1.2 | 1:1.8 |
|---|---|---|---|---|---|
| Result | Fail | Fail | work | work | Fail |
| Reason | Can not degrade at 95° C. | Can not degrade at 95° C. | degrade at 95° C. | degrade at 95° C. | Mixture is too viscous to add fibers |

It is true that other gradients, such as loading of fibers, have strong influence on properties of final composite, like strength, etc. But they are not critical to the disclosed performance (i.e., Tg>140° C., and degrade at 95° C.).

With standard industrial method, fibers, such as glass fibers, carbon fibers, aramid fibers, or and Kevlar® fiber for example, are then introduced inside the mixture to make so called bulk molding compound or sheet molding. The fiber volume loading may be between about 20% to about 60%, depending on the mechanical strength requirement.

Figure 4:
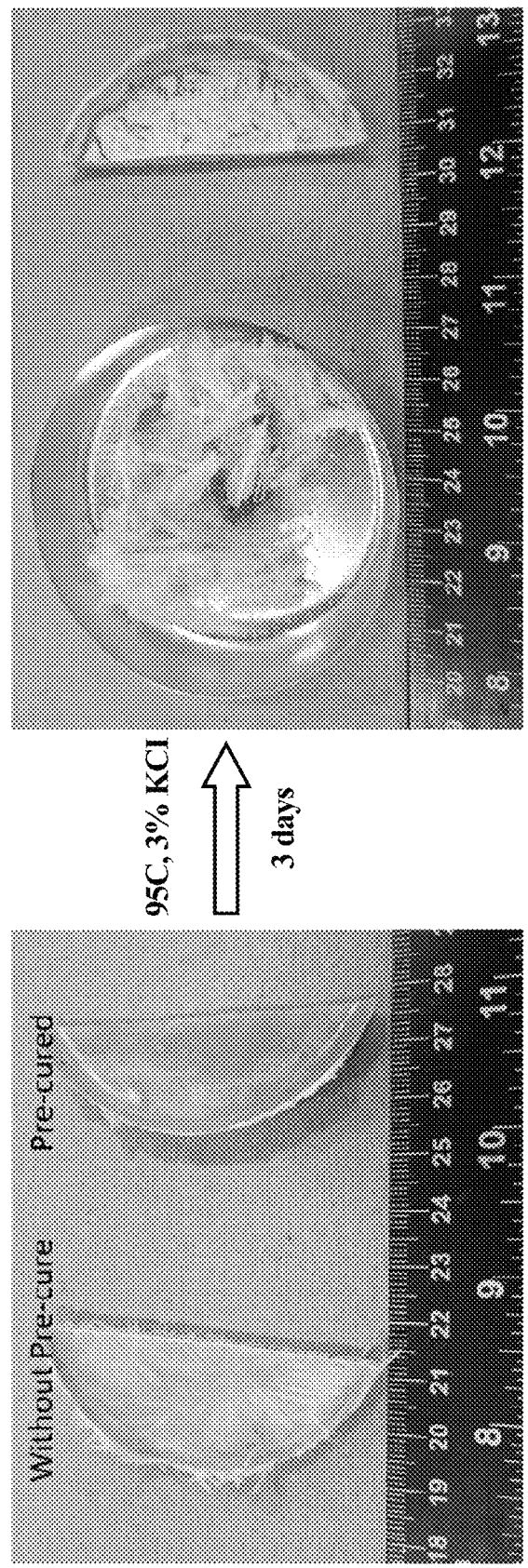
FIG. 4 shows degradation of degradable epoxy without pre-cure and with pre-cured formulation in brine at low temperature.

This formulation needs to be used/molded into parts within 24 hrs, pre-cure (or pre-crosslinking) may be prohibited. In composite fabrication industry, resins are typically pre-cured or "B-staged", which lead to a longer shelf time or better modeling quality. In the disclosed formulation, final composite cannot degrade at 95° C. if raw material is pre-crosslinked, as shown in FIG. 4.

Figure 5:
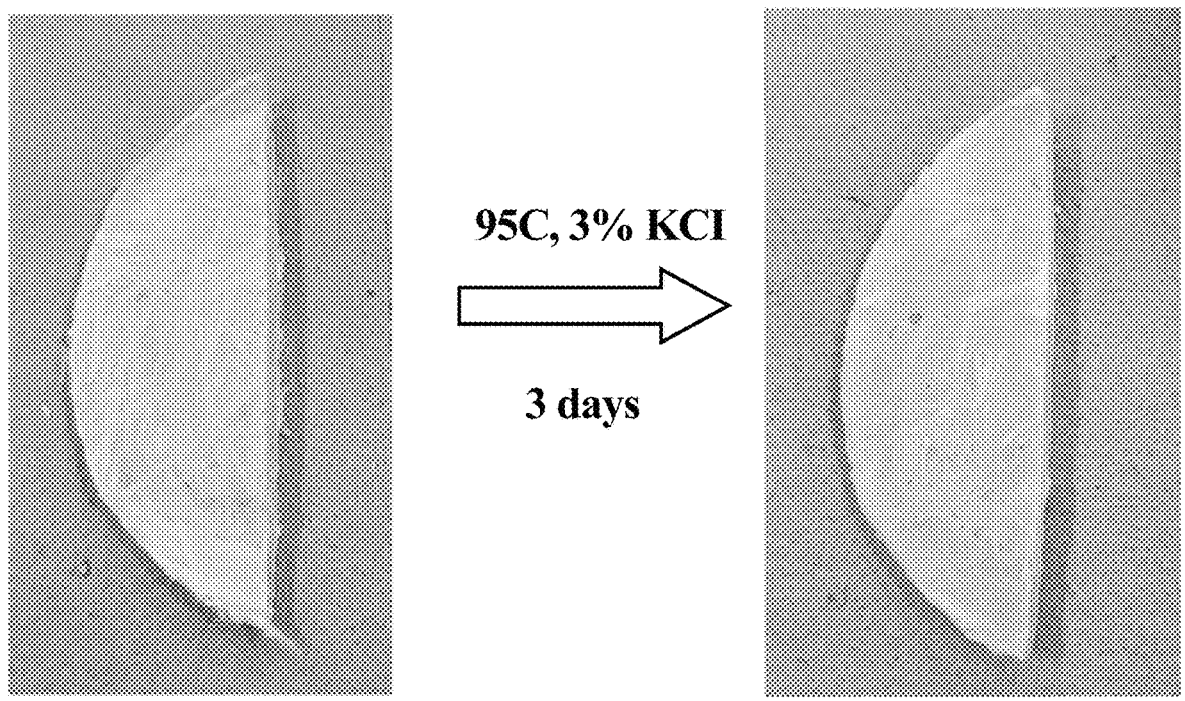
FIG. 5 shows molded part without post heat-treatment cannot degrade at low temperature.

Post heat-treatment might be critical afterwards to improve mechanical property (i.e., reduce stress or increase cross-linking density). Molded part without post heat-treatment cannot degrade at low temperature neither (FIG. 5). Post heat-treatment is typically done by heating molded parts at 150-200° C. for 5-24 hrs. The underline mechanism is still not clear and under investigation. It is believed post-treatment can help evaporating certain amount of un-cured molecules, generating pores for water to diffuse efficiently. Extra-machining might also be necessary if net-shape cannot be molded directly.

As described above, degradable thermoset composite may be formed from an epoxy resin, including at least flexibilized epoxy resins, such as one cycloaliphatic epoxide, for example. Other epoxy resins, additional cross-linkers, catalysts, toughening agents, flame retardants, and other additives may also be used in compositions disclosed herein. Each of these is described in more detail below.

Flexibilized Epoxy Resin

Flexibilized epoxy resins useful in embodiments disclosed herein may include epoxy resins modified with glycols, such as an aliphatic epoxy modified with polypropylene glycol; epoxidized polybutadiene; epoxidized caprolactones and caprolactones, silicone resin containing epoxy functionality; and epoxy vinyl ester resins, among others. In some embodiments, flexibilized epoxy resins may include bis(3,4-epoxy-6-methylcyclohexylmethyl) adipate; bis(3,4-epoxycyclohexyl) adipate (available as ERL-4299 from The Dow Chemical Company, Midland, Mich.). In other embodiments, flexibilized epoxy resins may include (3'-4'-epoxycyclohexane)methyl 3'-4'-epoxycyclohexyl-carboxylate modified ξ-caprolactone (available as CELLOXIDE 2080 series from Daicel Chemical Industries, Ltd, Japan.).

Other flexibilized epoxy resins may include polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example.)

Other flexibilized epoxy resins may include glycidated resins, epoxidized oils, and so forth. The glycidated resins are frequently the reaction product of epichlorohydrin and a bisphenol compound, such as bisphenol A; C4 to C28 alkyl glycidyl ethers; C2 to C28 alkyl- and alkenyl-glycidyl esters; C1 to C28 alkyl-, mono- and poly-phenol glycidyl ethers; polyglycidyl ethers of polyvalent phenols, such as pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene) phenol diglycidyl ether and (chloromethyl) oxirane Bisphenol A diglycidyl ether.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Other flexibilized epoxy may include cycloaliphatic epoxy or acyclic aliphatic epoxy, for example. Cycloaliphatic epoxy resins that may be used in various embodiments disclosed herein are described in, for example, U.S. Pat. Nos. 6,329,475, 6,329,473, 5,783,713, 5,703,195, 5,646,315, 5,585,446, 5,459,208, and 4,532,299, among others.

Since main function of flexibilized epoxy is providing high dissolving or degrading rate, high Tg is not required. To improve dissolving or degrading rate, there are two strategies. One is an epoxy with linear polymer chains, and another strategy is to choose epoxy with ester group in polymer chain. For practical application in plug market, this category of epoxy should be cost efficient, safe/easy processing, and commercially available in large scale. The following selections provides samples that can meet those requirements:

1. Polyglycidyl Ether of Substituted Glycerin

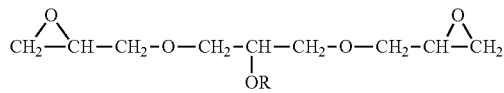

2. Phthalic Acid Diglycidyl Ester

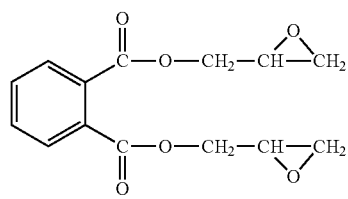 [SMILES: O=C(OCC1CO1)c1ccccc1C(=O)OCC1CO1]

3. Dimer acid diglycidyl ester

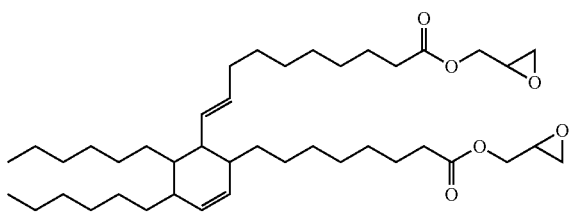 [SMILES: CCCCCCC1C=CC(CCCCCCCC(=O)OCC2CO2)C(/C=C/CCCCCCCC(=O)OCC2CO2)C1CCCCCC]

Novolac Resins and Multifunctional Epoxy Resins

Epoxy phenolic novolac resins useful in embodiments disclosed herein may include condensates of phenols with formaldehyde that are obtained under acid conditions, such as phenol novolacs, bisphenol A novolacs, and cresol novolacs.

Suitable multi-functional (polyepoxy) compounds may include resorcinol diglycidyl ether (1,3-bis-(2,3-epoxypropoxy)benzene), triglycidyl p-aminophenol (4-(2,3-epoxypropoxy)-N,N-bis(2,3-epoxypropyl)aniline), triglycidyl ether of meta- and/or para-aminophenol (3-(2,3-epoxypropoxy)N,N-bis(2,3-epoxypropyl)aniline), and tetraglycidyl methylene dianiline (N,N,N',N'-tetra(2,3-epoxypropyl) 4,4'-diaminodiphenyl methane), and mixtures of two or more polyepoxy compounds. A more exhaustive list of useful epoxy resins may be found in Lee, H. and Neville, K., *Handbook of Epoxy Resins*, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Other suitable epoxy resins are disclosed in U.S. Pat. No. 5,112,932. Such epoxy resins may include epoxy terminated polyoxazolidone-containing compounds, including, for example, the reaction product of a polyepoxide compound with a polyisocyanate compound. Polyepoxides may include diglycidyl ether of 2,2-bis(4-hydroxyphenyl) propane (generally referred to as bisphenol A) and diglycidyl ether of 2,2-bis(3,5-dibromo-4-hydroxyphenyl) propane (generally referred to as tetrabromobisphenol A). Suitable polyisocyanates include 4,4'-methylene bis(phenylisocyanate) (MDI) and isomers thereof, higher functional homologs of MDI (commonly designated as "polymeric MDI"), toluene diisocyanate (TDI) such as 2,4-toluene diisocyanate and 2,6-toluene diisocyanate, m-xylylene diisocyanate, hexamethylene diisocyanate (HMDI) and isophoronediisocyanate.

Examples of epoxy phenolic novolac resins, epoxy bisphenol A novolac resins and multifunctional epoxy resins useful in various embodiments disclosed herein may include phenol-formaldehyde novolacs, such as those available under the tradenames D.E.N. 431 and D.E.N. 438 available from The Dow Chemical Company, Midland, Mich., and EPON SU-8, available from Hexion Specialty Chemicals.

Bisphenol A and Bisphenol F Based Epoxy Resins

Other epoxy resins that may be used in various embodiments disclosed herein include 4,4'-dihydroxydiphenyl dimethyl methane (or bisphenol A), bis(4-hydroxyphenyl)methane (known as bisphenol F), diglycidyl ether of bromobisphenol A (2,2-bis(4-(2,3-epoxypropoxy)3-bromophenyl)propane), diglycidyl ether of Bisphenol F (2,2-bis (p-(2,3-epoxypropoxy)phenyl)methane), and other epoxy resins based on bisphenol A and bisphenol F. Bisphenol-A based epoxy resins may include, for example, diglycidyl ethers of bisphenol A; D.E.R. 332, D.E.R. 383, and D.E.R. 331 from The Dow Chemical Company, Midland, Mich. Bisphenol-F based epoxy resins may include, for example, diglycidyl ethers of bisphenol-F, as well as D.E.R. 354 and D.E.R. 354LV, each available from The Dow Chemical Company, Midland, Mich.

Useful epoxy resins include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl) propane; di- or polyglycidyl ethers of polyhydric alcohols such as 1,4-butanediol, or polyalkylene glycols such as polypropylene glycol, polyhydric phenols include resorcinol, 2,2-bis(4'-hydroxy-3',5'-dibromophenyl)propane, 1,1,2,2-tetrakis(4'-hydroxy-phenyl)ethane, polyglycidyl ethers of aliphatic and aromatic polycarboxylic acids, such as, for example, oxalic acid, succinic acid, glutaric acid, terephthalic acid, 2,6-naphthalene dicarboxylic acid, and dimerized linoleic acid; polyglycidyl ethers of polyphenols, such as, for example, 1,1-bis(4-hydroxyphenyl)ethane, 1,1-bis(4-hydroxyphenyl)isobutane, and 1,5-dihydroxy naphthalene; modified epoxy resins with acrylate or urethane moieties; glycidylamine epoxy resins; and novolac resins.

Since the targeting working temperature is from about 110 to about 175° C., besides high Tg, for application in plug market, this category of epoxy should also be cost-efficient, safe/easy processing, and commercially available in large scale. The following selections provides samples that can meet those requirements:

1.1 Various trademarks of epoxy resins based on bisphenol A diglycidyl ether (BADGE) are EPON® resin series, D.E.R® series, Epotuff® series, Araldite® series, EPI-Rez® series, and the ERL Bakelite® epoxy series

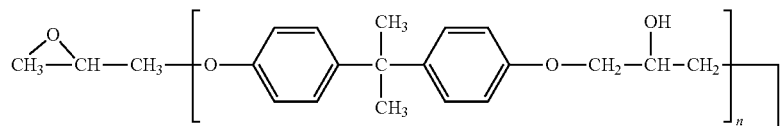

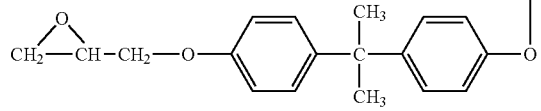

1.2 Polyglycidyl Ethers of Phenolic Novolacs and Polyglycidyl Ethers of Cresolic Novolacs

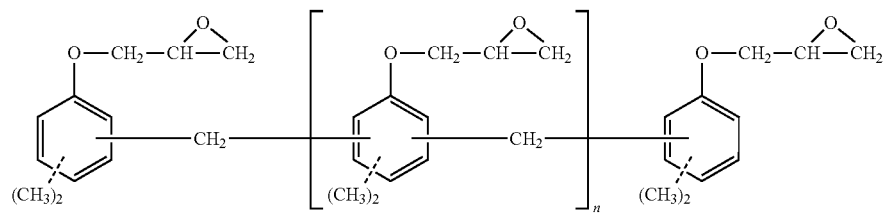

1.3 Aromatic Glycidyl Amines

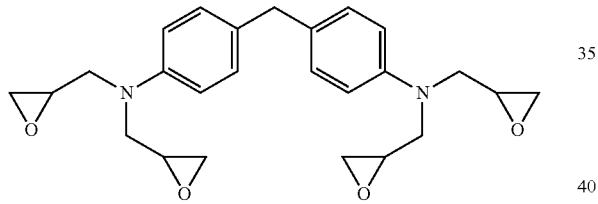

-continued

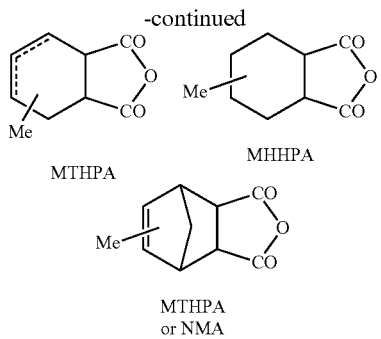

MTHPA

MHHPA

MTHPA or NMA

Anhydride Cross-Linker

Curable compositions disclosed herein may include one or more cycloaliphatic anhydride cross-linkers. Cycloaliphatic anhydride cross-linkers may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, and methyl tetrahydrophthalic anhydride, among others. Anhydride curing agents may also include copolymers of styrene and maleic acid anhydrides and other anhydrides as described in U.S. Pat. No. 6,613,839.

Most commercially available acid anhydride that is easy to process and cost efficient. The samples may include:

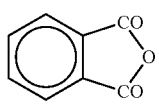 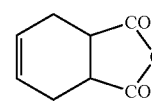 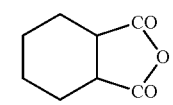

PA THPA HHPA

Additional Epoxy Resins

Additional epoxy resins may be used to tailor the properties of the resulting thermoset resins as desired. The additional epoxy resin component may be any type of epoxy resin, including any material containing one or more reactive oxirane groups, referred to herein as "epoxy groups" or "epoxy functionality." Additional epoxy resins useful in embodiments disclosed herein may include mono-functional epoxy resins, multi- or poly-functional epoxy resins, and combinations thereof. Monomeric and polymeric epoxy resins may be aliphatic, aromatic, or heterocyclic epoxy resins. The epoxies may be pure compounds, but are generally mixtures or compounds containing one, two or more epoxy groups per molecule. In some embodiments, epoxy resins may also include reactive —OH groups, which may react at higher temperatures with anhydrides, organic acids, amino resins, phenolic resins, or with epoxy groups (when catalyzed) to result in additional crosslinking.

Other suitable epoxy resins are disclosed in, for example, U.S. Pat. Nos. 7,163,973, 6,887,574, 6,632,893, 6,242,083, 7,037,958, 6,572,971, 6,153,719, and 5,405,688, PCT Publication WO 2006/052727, and U.S. Patent Application Publication Nos. 20060293172 and 20050171237.

Additional Cross-Linkers/Curing Agents

In addition to the dicyandiamide cross-linkers described above, additional cross-linkers or curing agents may also be provided for promoting crosslinking of the epoxy resin composition to form a polymer composition. As with the epoxy resins, the additional cross-linkers and curing agents may be used individually or as a mixture of two or more. The curing agent component (also referred to as a cross-linker or cross-linking agent) may include any compound having an active group being reactive with the epoxy group of the epoxy resin. The curing agents may include nitrogen-containing compounds such as amines and their derivatives; oxygen-containing compounds such as carboxylic acid terminated polyesters, anhydrides, phenol novolacs, bisphenol-A novolacs, DCPD-phenol condensation products, brominated phenolic oligomers, amino-formaldehyde condensation products, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of two or more of the above curing agents. Practically, polyamines, diaminodiphenylsulfone and their isomers, aminobenzoates, various acid anhydrides, phenol-novolac resins and cresol-novolac resins, for example, may be used, but the present disclosure is not restricted to the use of these compounds.

Other embodiments of cross-linkers that may be used are described in U.S. Pat. No. 6,613,839, and include, for example, copolymers of styrene and maleic anhydride having a molecular weight (MW) in the range of from 1500 to 50,000 and an anhydride content of more than 15 percent.

Other components that may be useful in the compositions disclosed herein include curing catalysts. Examples of curing catalyst include imidazole derivatives, tertiary amines, ammonium salts, phosphonium salts, and organic metallic salts. Other examples of such curing catalysts include free radical initiators, such as azo compounds including azoisobutyronitrile, and organic peroxides, such as tertiary-butyl perbenzoate, tertiary-butyl peroctoate, and benzoyl peroxide; methyl ethyl ketone peroxide, acetoacetic peroxide, cumene hydroperoxide, cyclohexanone hydroperoxide, dicumyl peroxide, and mixtures thereof. Methyl ethyl ketone peroxide and benzoyl peroxide are preferably used in the present invention.

In some embodiments, curing agents may include primary and secondary polyamines and their adducts, anhydrides, and polyamides. For example, polyfunctional amines may include aliphatic amine compounds such as diethylene triamine (D.E.H. 20, available from The Dow Chemical Company, Midland, Mich.), triethylene tetramine (D.E.H. 24, available from The Dow Chemical Company, Midland, Mich.), tetraethylene pentamine (D.E.H. 26, available from The Dow Chemical Company, Midland, Mich.), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used.

In some embodiments, the phenol novolac cross-linker may contain a biphenyl or naphthyl moiety. The phenolic hydroxy groups may be attached to the biphenyl or naphthyl moiety of the compound. This type of cross-linker may be prepared, for example, according to the methods described in EP915118A1. For example, a cross-linker containing a biphenyl moiety may be prepared by reacting phenol with bismethoxy-methylene biphenyl.

In other embodiments, curing agents may include boron trifluoride monoethylamine, and diaminocyclohexane. Curing agents may also include imidazoles, their salts, and adducts. These epoxy curing agents are typically solid at room temperature. One example of suitable imidazole curing agents includes 2-phenylimidazole; other suitable imidazole curing agents are disclosed in EP906927A1. Other curing agents include aromatic amines, aliphatic amines, anhydrides, and phenols.

In some embodiments, the curing agents may be an amino compound having a molecular weight up to 500 per amino group, such as an aromatic amine or a guanidine derivative. Examples of amino curing agents include 4-chlorophenyl-N,N-dimethyl-urea and 3,4-dichlorophenyl-N,N-dimethyl-urea.

Other examples of curing agents useful in embodiments disclosed herein include: 3,3'- and 4,4'-diaminodiphenylsulfone; methylenedianiline; bis(4-amino-3,5-dimethylphenyl)-1,4-diisopropylbenzene available as EPON 1062 from Shell Chemical Co.; and bis(4-aminophenyl)-1,4-diisopropylbenzene available as EPON 1061 from Shell Chemical Co.

Thiol curing agents for epoxy compounds may also be used, and are described, for example, in U.S. Pat. No. 5,374,668. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-di mercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris (thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4, 6-dithiol-sym-triazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio)benzene, bis-, tris- or tetra(mercaptoalkylthio)alkane, bis(mercaptoalkyl) disulfide, hydroxyalkylsulfidebis(mercaptopropionate), hydroxyalkylsulfidebis(mercaptoacetate), mercaptoethyl ether bis(mercaptopropionate), 1,4-dithian-2,5-diolbis(mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol.

The curing agent may also be a nucleophilic substance such as an amine, a tertiary phosphine, a quaternary ammonium salt with a nucleophilic anion, a quaternary phosphonium salt with a nucleophilic anion, an imidazole, a tertiary arsenium salt with a nucleophilic anion, and a tertiary sulfonium salt with a nucleophilic anion.

Aliphatic polyamines that are modified by adduction with epoxy resins, acrylonitrile, or (meth)acrylates may also be utilized as curing agents. In addition, various Mannich bases can be used. Aromatic amines wherein the amine groups are directly attached to the aromatic ring may also be used.

Figure 6:
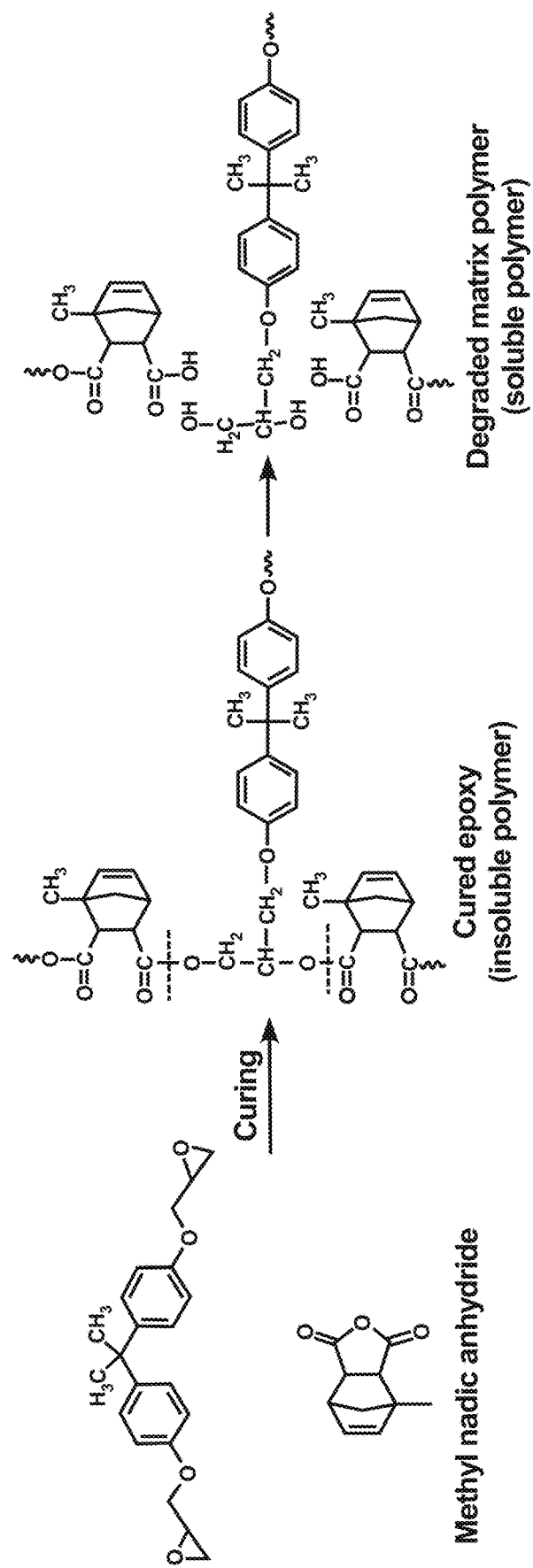
FIG. 6 shows a cure and hydrolysis process of BADGE epoxy resin with nadic methyl anhydride as cross-linker.
Figure 7:
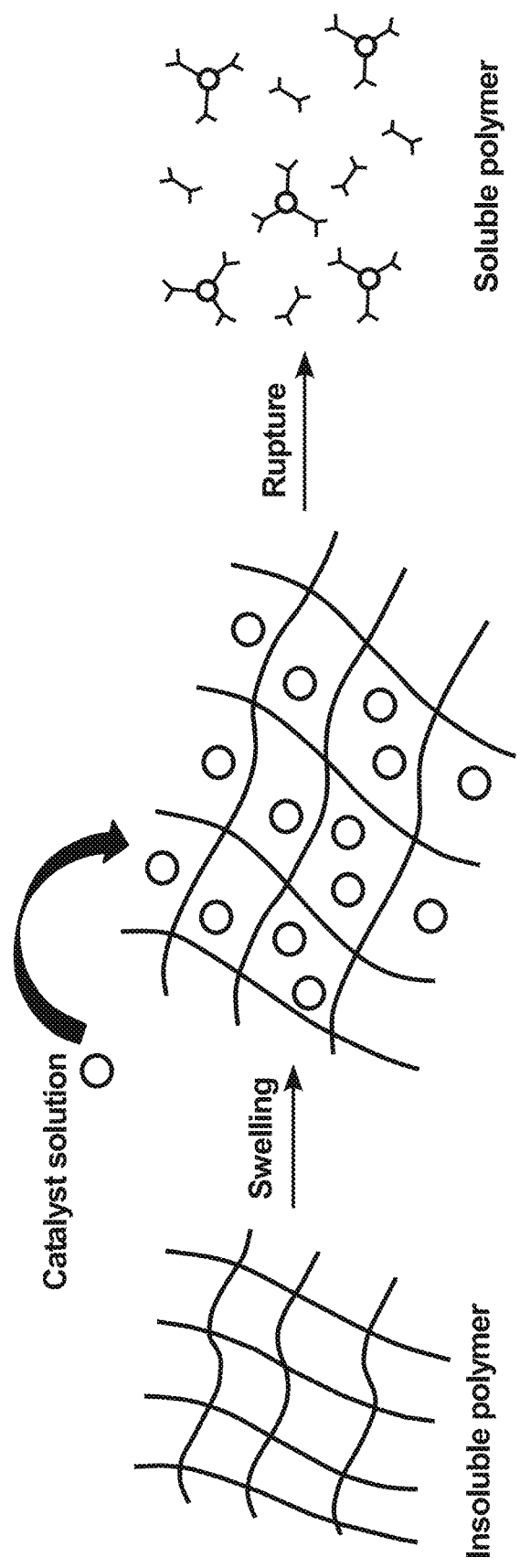
FIG. 7 shows schematic illustration of chemical degradation process of thermosetting polymer.

Quaternary ammonium salts with a nucleophilic anion useful as a curing agent in embodiments disclosed herein may include tetraethyl ammonium chloride, tetrapropyl ammonium acetate, hexyl trimethyl ammonium bromide, benzyl trimethyl ammonium cyanide, cetyl triethyl ammonium azide, N,N-dimethylpyrolidinium cyanate, N-methylpyridinium phenolate, N-methyl-o-chloropyridinium chloride, methyl viologen dichloride and the like. It has been well reported that epoxy can be cured by various chemistry, including amine, acid, etc. In order to make epoxy degradable, acid anhydride may be used as a cross-linker to introduce ester bond into cross-linked polymer chain (FIG. 6, Middle). Ester can be broken though hydrolysis process as shown in FIG. 6 right. This process is typically slow and requires extremely high temperature to activate. To make the degradable process suitable for downhole application, we add solid base (e.g., $Ca(OH)_2$, CaO, $Mg(OH)_2$, KOH, etc.) as a catalyst or filler to accelerate hydrolysis process in a process as illustrated in FIG. 7.

In some embodiments, at least one cationic photo initiator may be used. Cationic photo initiators include compounds that decompose when exposed to electromagnetic radiation of a particular wavelength or range of wavelengths to form a cationic species that may catalyze the polymerization reaction, such as between an epoxide group and a hydroxyl group. That cationic species may also catalyze the reaction of epoxide groups with other epoxide-reactive species contained in the curable composition (such as other hydroxyl groups, amine groups, phenolic groups, mercaptan groups, anhydride groups, carboxylic acid groups and the like). Examples of cationic photo initiators include diaryliodonium salts and triarylsulfonium salts. For example, a diaryliodonium salt type of photo initiator is available from Ciba-Geigy under the trade designation IRGACURE 250. A triarylsulfonium-type photo initiator is available from The Dow Chemical Company as CYRACURE 6992. The cationic photo initiator may be used in a catalytically effective amount, and may constitute up to about 10 weight percent of the curable composition.

Catalysts to Promote Reaction

In some embodiments, a catalyst may be used to promote the reaction between the epoxy resin component and the curing agent or cross-linker, including dicyandiamide and the phenolic cross-linker described above. Catalysts may include a Lewis acid, for example boron trifluoride, conveniently as a derivative with an amine such as piperidine or methyl ethylamine. Catalysts may also be basic, such as, for example, an imidazole or an amine. Other catalysts may include other metal halide Lewis acids, including stannic chloride, zinc chloride, and the like, metal carboxylate-salts, such as stannous octoate and the like; benzyl dimethylamine; dimethyl aminomethyl phenol; and amines, such as triethylamine, imidazole derivatives, and the like.

Tertiary amine catalysts are described, for example, in U.S. Pat. No. 5,385,990, incorporated herein by reference. Illustrative tertiary amines include methyldiethanolamine, triethanolamine, diethylaminopropylamine, benzyldimethyl amine, m-xylylenedi(dimethylamine), N,N'-dimethylpiperazine, N-methylpyrolidine, N-methyl hydroxypiperidine, N,N,N'N'-tetramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino)propane, pyridine and the like. Other tertiary amines include 1,8-diazobicyclo [5.4.0]-7-ene, 1,8-diazabicyclo[2.2.2]octane, 4-dimethylaminopyridine, 4-(N-pyrolidino)pyridine, triethyl amine and 2,4,6-tris(dimethylaminomethyl)phenol.

Catalysts to Help Degrade the Composite

As discussed previously, a solid base or solid acid including but not limited to $Ca(OH)_2$, CaO, $Mg(OH)_2$, KOH, NaOH, etc. Without catalyst, even the degradable thermoset composite cannot be hydrolyzed.

Toughening Agents

Toughening agents may be used to prevent the composites disclosed herein from becoming brittle when the epoxy resin cures. In some embodiments, toughening agents may be rubber compounds and block copolymers. Toughening agents function by forming a secondary phase within the polymer matrix. This secondary phase is rubbery and hence is capable of crack growth arrestment, providing improved impact toughness.

Toughening agents used to improve fracture toughness of epoxies include FORTEGRA 100, block copolymers, CTBN, amphiphilic block copolymers, linear polybutadiene-polyacrylonitrile copolymers, oligomeric polysiloxanes, and organopolysiloxane resins. Other toughening agents may include carboxyl terminated butadiene, polysulfide-based toughening agents, amine-terminated butadiene nitrile, and polythioethers. Toughening agents are described in, for example, U.S. Pat. Nos. 5,262,507, 7,087,304 and 7,037,958, and U.S. Patent Application Publication Nos. 20050031870 and 20060205856, among others. Amphiphilic toughening agents are disclosed in, for example, PCT Patent Application Publications WO2006/052725, WO2006/052726, WO2006/052727, WO2006/052729, WO2006/052730, and WO2005/097893, U.S. Pat. No. 6,887,574, and U.S. Patent Application Publication No. 20040247881.

The amount of toughening agent used in the curable compositions described herein may depend on a variety of factors including the equivalent weight of the polymers, as well as the desired properties of the products made from the composition. In general, the amount of toughening agent may be from 0.1 weight percent to 30 weight percent in some embodiments, from 0.5 weight percent to 10 weight percent in other embodiments, and from 1 weight percent to 5 weight percent in yet other embodiments, based on the total weight of the curable composition.

Optional Additives

Curable compositions and thermoset resins disclosed herein may optionally include conventional additives and fillers. Additives and fillers may include, for example, other flame retardants, boric acid, silica, glass, talc, metal powders, titanium dioxide, wetting agents, pigments, coloring agents, mold release agents, coupling agents, ion scavengers, UV stabilizers, flexibilizing agents, and tackifying agents. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the epoxy resin composition. Additionally, these optional additives may have an effect on the properties of the composition, before and/or after curing, and should be considered when formulating the composition and the desired reaction product. Curable compositions disclosed herein may also optionally contain other additives of a generally conventional type including for example, stabilizers, other organic or inorganic additives, pigments, wetting agents, flow modifiers, UV light blockers, and fluorescent additives. These additives may be present in amounts of from 0 to 5 weight-percent in some embodiments, and less than 3 weight percent in other embodiments. Examples of suitable additives are also described in U.S. Pat. No. 5,066,735 and PCT/US2005/017954.

Curable Compositions

Curable compositions may be formed by combining a mixture of a) one or more of a flexibilized resin, b) a catalyst, and c) an anhydride cross-linker. Additional cross-linkers, epoxy resins, catalysts, toughening agents and other additives may also be added, as described above. The relative proportions of the epoxy resin mixtures and the cycloaliphatic anhydride cross-linker may depend, in part, upon the properties desired in the curable composition or thermoset compositions to be produced, the desired cure response of the composition, and the desired storage stability of the composition (desired shelf life).

In some embodiments, the epoxy resin (cycloaliphatic epoxide or with other epoxy resins as described above) may be present in the curable composition in an amount ranging from about 0.1 to about 99 weight percent of the curable composition, based on the total weight of the epoxy resin mixture, the catalyst and the anhydride cross-linker. In other embodiments, the epoxy composition may range from about 5 to about 95 weight percent of the curable composition; from about 15 to about 85 weight percent in other embodiments; from about 25 to about 75 weight percent in other embodiments; from about 35 to about 65 weight percent in other embodiments; and from about 40 to about 60 weight percent in yet other embodiments, where the above percentages are based on the total weight of the epoxy resin mixture, the catalyst, and the cycloaliphatic anhydride cross-linker.

In some embodiments, the anhydride cross-linker, such as cycloaliphatic anhydride cross-linkers, or a mixture of cycloaliphatic anhydride cross-linkers may be present in the curable composition in an amount ranging from 0.1 to 99 weight percent of the curable composition, based on the total weight of the epoxy resin mixture, the catalyst, and the cycloaliphatic anhydride cross-linker. In other embodiments, the cycloaliphatic anhydride cross-linker may range from about 5 to about 95 weight percent of the curable composition; from about 15 to about 85 weight percent in other embodiments; from about 25 to about 75 weight percent in other embodiments; from about 35 to about 65 weight percent in other embodiments; and from about 40 to about 60 weight percent in yet other embodiments, where the above percentages are based on the total weight of the epoxy resin mixture, the catalyst, and the cycloaliphatic anhydride cross-linker.

In some embodiments, a catalyst may be present in the curable composition in an amount ranging from about 1 weight percent to about 40 weight percent. In other embodiments, the catalyst may be present in an amount ranging from about 2 weight percent to about 30 weight percent; from about 5 weight percent to about 25 weight percent in other embodiments; and from about 8 to about 20 weight percent in yet other embodiments, where the above ranges are based on the total weight of the epoxy resin mixture, the catalyst, and the cycloaliphatic anhydride cross-linker.

Additional epoxy resins may be used in some embodiments of the curable compositions in an amount ranging from about 0.01 weight percent to about 20 weight percent, based on the total weight of the curable composition. In other embodiments, additional epoxy resins may be present in an amount ranging from about 0.1 weight percent to about 8 weight percent; from about 0.5 weight percent to about 6 weight percent in other embodiments; and from about 1 to about 4 weight percent in yet other embodiments.

Additional cross-linkers may be used in some embodiments of the curable compositions in an amount ranging from about 0.01 weight percent to about 20 weight percent, based on the total weight of the curable composition. In other embodiments, additional cross-linkers may be present in an amount ranging from about 0.1 weight percent to about 8 weight percent; from about 0.5 weight percent to about 6 weight percent in other embodiments; and from about 1 to about 4 weight percent in yet other embodiments.

Curable compositions may also include from about 0.1 to about 50 volume percent optional additives in some embodiments, based on the total volume of the curable composition. In other embodiments, curable compositions may include from about 0.1 to about 5 volume percent optional additives; and from about 0.5 to about 2.5 volume percent optional additives in yet other embodiments.

Composites And Coated Structures

In some embodiments, composites may be formed by curing the curable compositions disclosed herein. In other embodiments, composites may be formed by applying a curable composition to a substrate or a reinforcing material, such as by impregnating or coating the substrate or reinforcing material, and curing the curable composition.

The above described curable compositions may be in the form of a powder, slurry, or a liquid. After a curable composition has been produced, as described above, it may be disposed on, in, or between the above described substrates, before, during, or after cure of the curable composition.

For example, a composite may be formed by coating a substrate with a curable composition. Coating may be performed by various procedures, including spray coating, curtain flow coating, coating with a roll coater or a gravure coater, brush coating, and dipping or immersion coating.

In various embodiments, the substrate may be monolayer or multi-layer. For example, the substrate may be a composite of two alloys, a multi-layered polymeric article, and a metal-coated polymer, among others, for example. In other various embodiments, one or more layers of the curable composition may be disposed on or in a substrate. Other multi-layer composites, formed by various combinations of substrate layers and curable composition layers are also envisaged herein.

In some embodiments, the heating of the curable composition may be localized, such as to avoid overheating of a temperature-sensitive substrate, for example. In other embodiments, the heating may include heating the substrate and the curable composition.

The curable compositions and composites described herein may be useful as adhesives, structural and electrical laminates, coatings, castings, downhole temporary blocking agents, structures for the aerospace industry, and as circuit boards and the like for the electronics industry, except for downhole tools, among other applications. The curable compositions disclosed herein may also be used in electrical varnishes, encapsulants, semiconductors, general molding powders, filament wound pipe, storage tanks, liners for pumps, and corrosion resistant coatings, among others. In selected embodiments, the curable compositions described herein may be useful in the formation of resin coated foils, similar to those as described in U.S. Pat. No. 6,432,541.

Various processing techniques can be used to form composites containing the epoxy-based compositions disclosed herein. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and cured to form a composite.

Temperature Rating of Disclosed Degradable Epoxy

Figure 8:
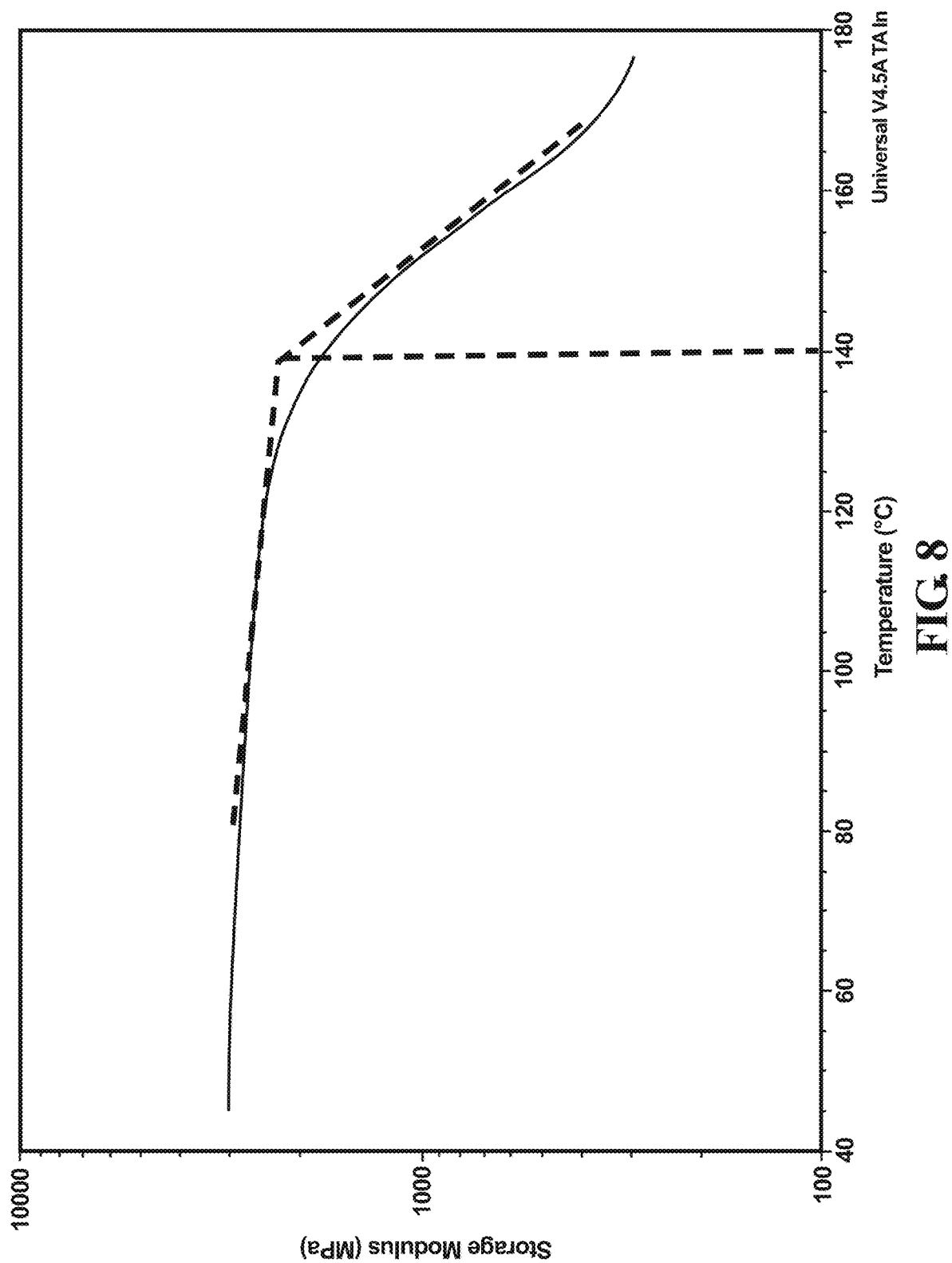
FIG. 8 shows DMA measurement of one degradable epoxy with high temperature rating according to an embodiment of the present disclosure.

As shown in FIG. 8, composite made from disclosed technique has glass transition temperature (Tg) over 140° C.

Dissolving Property of Disclosed Degradable Epoxy

Figure 9:
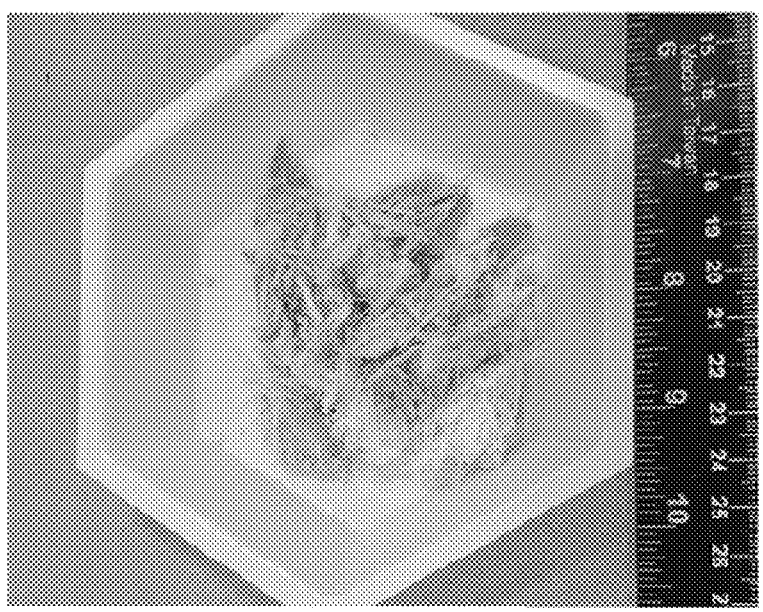
FIG. 9 shows degradation of fiber enhanced composite made of one degradable epoxy formulation in brine at low temperature.
Figure 9:

After made into fiber enhanced composites, final composite material (thick composite disk) can degrade in brine after three days at temperature of 95° C., leaving short fibers (FIG. 9).

Solid base catalyst is crucial to hydrolysis of degradable epoxy. Test shows that both solid acid and solid base can catalyze the hydrolysis process. Solid base may be better because the material degrades in the form of surface-etching process, which does not deteriorate mechanical properties of whole material during degradation process.

The mechanical strength of final composite is dependent on various parameters including fiber selection, fiber length, fiber loading, bonding between fiber/matrix, molding process, etc. The typical tensile strength of proposed fiber is between about 10 ksi to about 30 ksi, and their mechanical strength does not deteriorate as long as it is below Tg.

The above shows and describes the basic principles, main features and advantages of the utility patent application. Those skilled in the industry should understand that the present utility patent application is not limited by the above-mentioned embodiments. The above-mentioned embodiments and the description are only preferred examples of the present utility patent application and are not intended to limit the present utility patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. A degradable thermoset composite, comprising a reaction product of:
an epoxy resin, wherein the epoxy resin comprises at least one cycloaliphatic epoxide;
a cross-linker; fibers, wherein fibers are at least one of glass fibers, carbon fibers, aramid fibers, wherein loadings of fibers are from about 20% to about 40% in volume; and
a catalyst for accelerating hydrolysis of the thermoset composite, wherein the catalyst comprises a solid inorganic acid; wherein the cycloaliphatic epoxide comprises bis-(3,4-epoxycyclohexyl) adipate;
wherein the degradable thermoset composite has a glass transition temperature greater than or equal to about 140° C. as measured by DMA, wherein the reaction product has a tensile strength of at least about 10,000 psi, wherein the cross-linker comprises a cycloaliphatic anhydride, the cycloaliphatic anhydride comprises norbornene-based dicarboxylic anhydride, the norbornene-based dicarboxylic anhydride comprises nadic anhydride, wherein the degradable thermoset composite degrades from about 80° C. to about 150° C. under water or brine, wherein stoichiometric ratio between the cycloaliphatic epoxide and the norbornene-based dicarboxylic anhydride is about from about 1:1 to about 1:1.5, wherein ratio between the cycloaliphatic epoxide and the catalyst is about 1:08 to about 1:1.2 by weight.

2. A process for forming a degradable thermoset composition, the process comprising:
admixing an epoxy and a cross-linker to form a mixture at room temperature;
adding a catalyst to the mixture, wherein the catalyst is for accelerating hydrolysis of the thermoset composite, wherein the catalyst comprises a solid inorganic acid; and
mixing with fibers to make raw materials, wherein the epoxy comprises at least one at least one cycloaliphatic epoxide, wherein fibers are at least one of glass fibers, carbon fibers, aramid fibers, wherein loadings of fibers are from about 20% to about 40% in volume; wherein the cycloaliphatic epoxide comprises bis-(3,4-epoxycyclohexyl) adipate;
wherein the degradable thermoset composite has a glass transition temperature greater than or equal to about 140° C. as measured by DMA, wherein the reaction product has a tensile strength of at least about 10,000 psi, wherein the cross-linker comprises a cycloaliphatic anhydride, the cycloaliphatic anhydride comprises norbornene-based dicarboxylic anhydride, the norbornene-based dicarboxylic anhydride comprises nadic anhydride, wherein the degradable thermoset composite degrades from about 80° C. to about 150° C. under water or brine, wherein stoichiometric ratio between the cycloaliphatic epoxide and the norbornene-based dicarboxylic anhydride is about from about 1:1 to about 1:1.5, wherein ratio between the cycloaliphatic epoxide and the catalyst is about 1:08 to about 1:1.2 by weight.

3. The process of claim 2 further comprising molding raw materials into near-net shape parts with hot press.

4. The process of claim 3 further comprising post treating the near-net shape parts.

5. The process of claim 3, wherein the molding process is conducted within 24 hours without a pre-cure process.

* * * * *